No. 607,384. Patented July 12, 1898.
J. MULLIGAN.
COOKING BOILER.
(Application filed Feb. 17, 1898.)
(No Model.)

WITNESSES:

INVENTOR:
John Mulligan.
By R. J. McCarty,
ATTORNEY.

UNITED STATES PATENT OFFICE.

JOHN MULLIGAN, OF DAYTON, OHIO.

COOKING-BOILER.

SPECIFICATION forming part of Letters Patent No. 607,384, dated July 12, 1898.

Application filed February 17, 1898. Serial No. 670,630. (No model.)

*To all whom it may concern:*

Be it known that I, JOHN MULLIGAN, a citizen of the United States, residing at Dayton, in the county of Montgomery and State of Ohio, have invented certain new and useful Improvements in Cooking-Boilers; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

This invention relates to new and useful improvements in cooking-boilers.

The object of the invention is to provide a cooking utensil in which the temperature may be maintained at any degree that may be desired and in which the flavor of the various articles of food is preserved while in a state of cooking—a utensil which is equally adapted for roasting, baking, or boiling, and which will be hereinafter fully described in the accompanying specification in connection with the annexed drawings.

Figure 1:
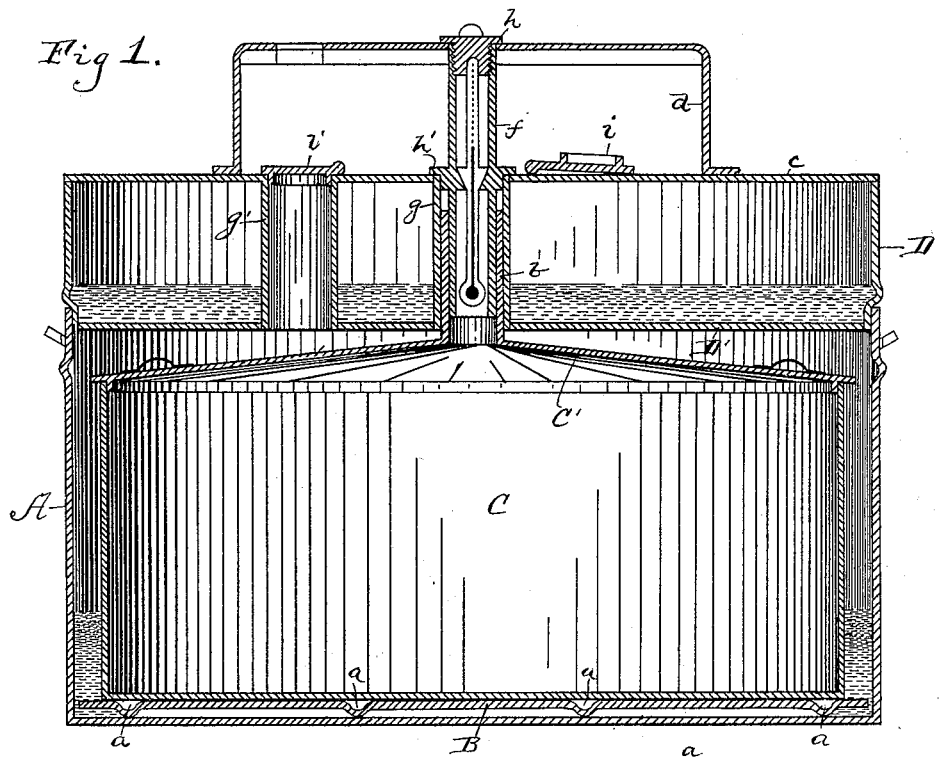
Figure 2:
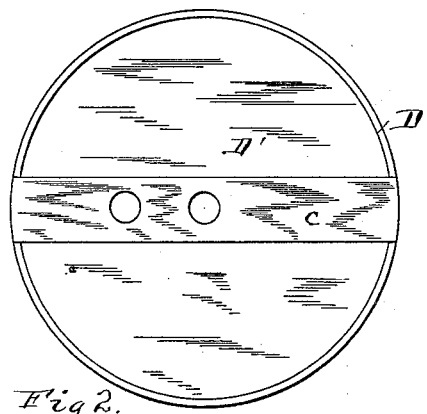
Figure 3:
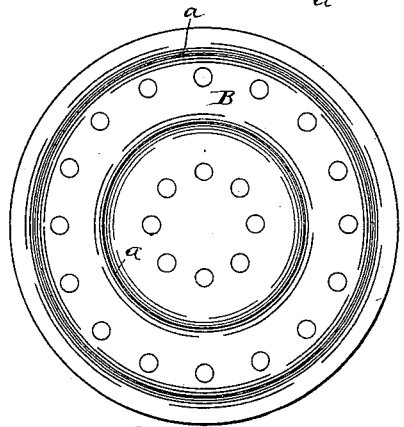

Referring to said drawings, Figure 1 is a vertical mid-sectional elevation of my improved cooking vessel. Fig. 2 is a top plan view of Fig. 1 on a reduced scale, the handle and thermometer being removed. Fig. 3 is a top plan view of the false bottom removed.

Similar letters of reference indicate the same parts in the several views of the drawings.

A is the outer or water vessel, in the bottom of which there is placed a false bottom B, that has two concentric rows of concavo-convex grooves $a$, which form supporting-ribs that enable the said false bottom to stand up from the bottom of the said outer vessel A.

C is the inner vessel, resting on said false bottom and in which the article to be cooked is placed and around the exterior of which a suitable quantity of water is placed. This inner vessel may be used for a variety of cooking—such, for example, as stewing, boiling, baking, roasting, &c. When either of the two former kinds of cooking is being done, the necessary amount of water is placed in the inner vessel; but it will be borne in mind that the water thus placed in the inner vessel is not intended to constitute the heating or cooking agent, but should be only sufficient to produce the necessary gravy or liquid essence. The inner vessel has a dome-shaped lid C', the center of which is provided with a central tube $b$, that projects up.

D is a hollow supplementary lid or cover having a bottom D', and its top open, except where a transverse bar $c$ is placed to provide a place for the attachment of a handle $d$ and for the support of a thermometer $f$. The said hollow cover has two tubular cases $g$ and $g'$, the former of which is in the center and fits over the tube $b$ in the lid C'. The thermometer $f$ is projected down into one or the other of these tubes, as required, and is supported in such position by a flange $h$ on the said cross-piece $c$ and a flange $h'$. When the thermometer is in the center tube, which, it will be seen, communicates with the interior of the inner vessel, the temperature of said inner vessel may be ascertained and made to suit the requirements. In order to ascertain the temperature of the interior of the outer vessel, the thermometer may be placed in the tube or case $g'$, which, it will be seen, communicates with the outer vessel only. Thus the temperature of both vessels may be known and the article of food cooked properly.

It is a common practice to cook various kinds of food without knowing or understanding the effect of temperatures thereon or what temperature is best suited for cooking a certain article of food, and the nutritious properties of food is often destroyed through this lack of proper knowledge. These faults may be avoided by the use of the above-described utensil. Articles requiring a limited quantity of water or liquid may be properly cooked by the temperature of the outer vessel. The tubular cases $g$ $g'$ may be closed by lids $i$ $i'$. The handle $d$ may be attached to the bar $c$ in any suitable way. The said covers and handle are removed from Fig. 2. The supplementary lid D must contain a quantity of water, as shown, to enable the surplus of heat to pass from the outer vessel. This lid causes the steam to condense in the vessel below without diminishing the water in said vessel. The water in the lower vessel does not become heated above boiling-point, owing to this condensation of the steam against the lid. The case $g'$ acts as a safety-valve when the steam in the lower vessel obtains a given volume, so that there is only an amount accumulating in said vessel that can be readily condensed.

Having described my invention, I claim—

The herein-described cooking utensil, comprising an outer vessel, and an inner vessel, a lid for the latter vessel having an upper tubular extension, a cover for both the outer and inner vessels having an open top, and a transverse bar across said top with two tubular extensions which are adapted to receive a thermometer, one of said tubular portions inclosing the tube projecting from the cover of the inner vessel and communicating with the interior of said inner vessel, and the other of said tubular portions being adapted to inclose said thermometer and communicating with the interior of the outer vessel, as herein shown and described.

In testimony that I claim the foregoing as my own I hereto affix my signature in presence of two witnesses.

JOHN MULLIGAN.

Witnesses:
R. J. McCARTY,
A. J. FIORINI.